No. 774,422. PATENTED NOV. 8, 1904.
J. F. HARRIGAN.
SIPHON.
APPLICATION FILED JUNE 30, 1904.
NO MODEL.
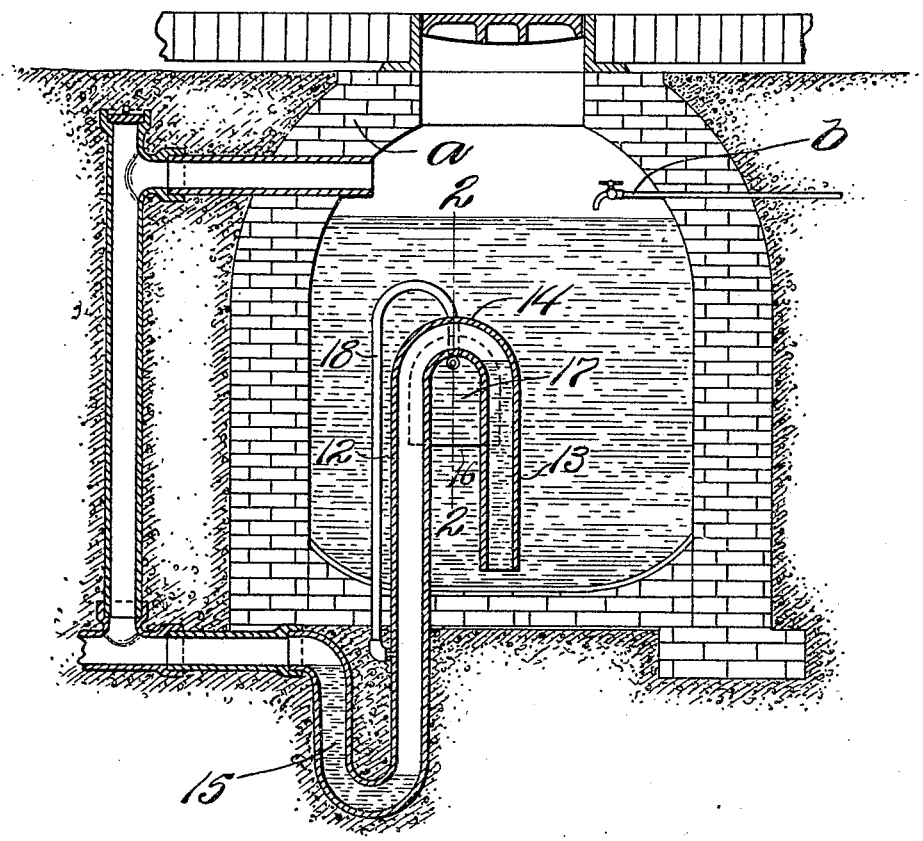

No. 774,422.

Patented November 8, 1904.

UNITED STATES PATENT OFFICE.

JOHN F. HARRIGAN, OF BOSTON, MASSACHUSETTS.

SIPHON.

SPECIFICATION forming part of Letters Patent No. 774,422, dated November 8, 1904.

Application filed June 30, 1904. Serial No. 214,791. (No model.)

*To all whom it may concern:*

Be it known that I, JOHN F. HARRIGAN, of Boston, in the county of Suffolk and State of Massachusetts, have invented certain new and useful Improvements in Siphons, of which the following is a specification.

This invention relates to automatic siphons, which operate automatically to discharge a body of water from a flushing-tank or other receptacle when the water rises to a predetermined height in said receptacle.

The invention has for its object to provide an ordinary siphon composed of shorter and longer legs connected by a crown and having a continuous or uninterrupted bore with means for causing the rising water in the receptacle to force air into the longer leg of the siphon under sufficient pressure and in sufficient volume to insure the forcing out of the liquid from the trap connected with the longer leg, thus releasing the air in the siphon and permitting the water in the tank to flow through the siphon.

The invention consists in the improvements which I will now proceed to describe and claim.

Of the accompanying drawings, forming a part of this specification, Figure 1 represents a sectional view of a flush-tank provided with a siphon embodying my invention. Fig. 2 represents a perspective section on line 2 2 of Fig. 1. Fig. 3 represents a section showing a somewhat different form of air-chamber from that shown in Fig. 2.

The same reference characters indicate the same parts in all the figures.

In the drawings, 12 represents the longer leg of a siphon, 13 represents the shorter leg, and 14 represents the neck or crown connecting said legs, the siphon being of the usual form and construction and having a continuous or uninterrupted bore. The longer leg communicates with a suitable trap 15, which is normally sealed by a body of liquid.

In carrying out my invention I utilize the space between the upper portions of the legs 12 and 13 and under the crown 14 as an air-chamber by forming on or securing to the said legs and crown two side plates or walls 16 16, which in conjunction with the legs 12 and 13 and crown 14 form an air-chamber 17, which is open at its lower end between the legs 12 and 13. 18 represents a tube, which extends from the upper portion of the air-chamber 17 to the longer leg 12 at a point below the intake end of the shorter leg 13 and above the trap 15. The air-chamber 17 should be of such capacity that it will contain a body of air, which when compressed by rise of water in the tank *a* containing the siphon will coöperate with the air compressed within the siphon in forcing out the sealing liquid from the trap 15 while the liquid is rising in the tank. The necessary capacity of the air-chamber may be secured by making the side walls 16 vertical and extending them downwardly far enough to compensate for the relatively narrow space between them, as shown in Figs. 1 and 2. The said side walls may, however, be flared or inclined outwardly, as shown in Fig. 3, to increase the width of the space between them, in which case the depth of said space may be considerably less than that shown in Fig. 2. In all cases the lower end of the air-chamber must be above the intake end of the shorter leg of the siphon, although said lower end may be very close to the said intake end, if desired. The air-pipe 18 is preferably extended upwardly for a short distance above its junction with the air-chamber and is then bent downwardly, as shown in Fig. 1, this arrangement enabling me to utilize all the air that is contained in the chamber 17. If desired, however, the air-tube may extend downward directly from its junction with the air-chamber without being first extended upwardly.

The discharge of water from the tank *a* may be regulated by the length of the legs of the siphon or by the capacity of the air-chamber or by the depth of the trap 15 and by the coöperation of any two or all three of these factors.

It will be seen that by casting or otherwise forming the side walls 16 16 on the legs and crown of an ordinary siphon I obtain an efficient air-chamber capable of supplying the power required to blow out the trap without adding materially to the bulk or to the expense of the siphon and without involving a separately-constructed air-chamber, the legs and crown of the siphon being utilized in the formation of the air-chamber. The described construction includes in one structure an air-chamber and a siphon, the siphon having a continuous or uninterrupted bore, so that water flows through it with the minimum of frictional resistance, there being nothing to break up or confuse the current of water.

Assuming that the tank is substantially empty and that water is being admitted through a supply-pipe $b$, it will be seen that as the water rises above the lower open end of the air-chamber the air in said chamber and in the siphon will be compressed, the compression increasing as the water rises in the tank until the confined cushion of air has sufficient force to blow out the liquid from the trap 15. The discharging operation of the siphon then commences, water flowing through the air-chamber 17 and tube 18, as well as through the siphon, until the water in the tank falls below the mouth of the air-chamber, after which the flow of water through the siphon continues until the water in the tank falls below the shorter leg of the siphon. The siphon is vented through the air-chamber 17 and tube 18.

The tube 18 may be made of relatively small diameter to reduce weight and expense of construction to the minimum. I have used with good results a tube having an internal diameter of one inch.

I claim—

A siphon comprising a shorter leg, a longer leg, a crown integral with and connecting said legs, a trap constituting an extension of the longer leg, opposed side walls joined to the crown and to the portions of the legs adjacent thereto and forming a chamber between said legs, said chamber having an open lower end located above the intake end of the shorter leg, and a tube connecting the upper portion of said chamber with the longer leg at a point above the trap and below the intake end of the shorter leg, said chamber being adapted to confine a body of air which is forced by the rise of liquid above the lower end of the chamber to pass into the longer leg of the siphon and expel the sealing liquid from the trap, the chamber and tube thereafter constituting a supplemental siphon for the passage of liquid to the longer leg of the main siphon.

In testimony whereof I have affixed my signature in presence of two witnesses.

JOHN F. HARRIGAN.

Witnesses:
C. F. BROWN,
E. BATCHELDER.